United States Patent [19]

Waldron et al.

[11] 4,266,246
[45] May 5, 1981

[54] CONTINUOUS MOTION TELECINE APPARATUS AND METHOD

[75] Inventors: Christopher J. Waldron, Harston; Raymond Matchell, Braughing, both of England

[73] Assignee: The Rank Organisation Limited, London, England

[21] Appl. No.: 109,269

[22] Filed: Jan. 3, 1980

[30] Foreign Application Priority Data

Jan. 4, 1979 [GB] United Kingdom ............... 00229/79

[51] Int. Cl.³ .......................... H04N 3/36; H04N 9/11
[52] U.S. Cl. ........................................ 358/216; 358/54
[58] Field of Search ............................ 358/214, 216, 54

[56] References Cited

U.S. PATENT DOCUMENTS

| 4,127,869 | 11/1978 | Millward | 358/54 |
|---|---|---|---|
| 4,151,560 | 4/1979 | Zinchuk | 358/214 |

Primary Examiner—John C. Martin
Attorney, Agent, or Firm—Brisebois & Kruger

[57] ABSTRACT

The invention concerns a method of deriving a television signal representing picture information on a cinema film, and a telecine apparatus according to such method. A disadvantage of continuous motion telecine equipment of the kind using a single linear array of photo-sensitive devices is that in order to derive the standard number of active (i.e. picture information containing) lines from each film frame the line frequency of scanning the array has to be changed in accordance with the particular film format being handled and the film frame rate. The apparatus of the present specification avoids this by using a rectangular matrix of photo-sensitive devices whose interrogation is controlled by a control unit in such manner that each film frame image focussed on the matrix is scanned along a plurality of rows of the matrix with the interrogation being stepped from one row to the next during the scanning. By selecting the number of rows interrogated and the direction of stepping in accordance with the current film format and frame rate a desired number of active lines can be derived from each film frame without needing to change the line frequency of scanning. Furthermore, by stopping the film with an image of a frame thereof focussed on the matrix a still picture may be produced by cyclically interrogating the matrix row-by-row.

8 Claims, 1 Drawing Figure

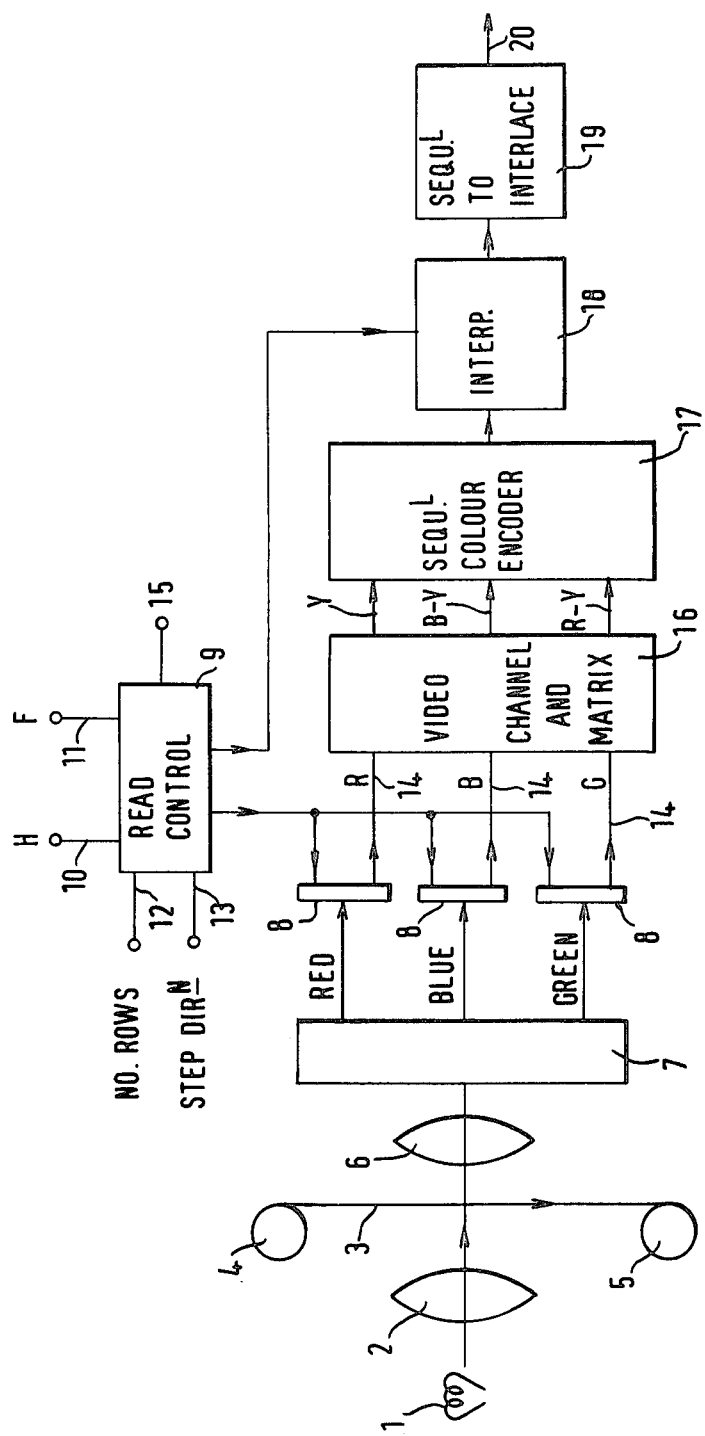

CONTINUOUS MOTION TELECINE APPARATUS AND METHOD

This invention relates to a method of deriving a television signal representative of picture information on a cinema film, and to a telecine apparatus operating according to such method.

Continuous motion telecine equipments employing a linear photo-sensitive array have been described previously and are well known in the art. Such telecine systems operate by moving the film to be televised past a single row of photo-sensitive devices at a film projection rate of 24 or 25 frames per second.

The photo-sensitive array may be scanned at the equivalent of 525 lines per film frame for N.T.S.C. system, or 625 lines per film frame for P.A.L. or SECAM systems.

If for the sake of simplicity we neglect the effect of the television system blanking on the actual number of lines used, and assuming that a means for passing light through the film is also provided, then obviously 625 lines of signal will be generated sequentially from each film frame if we operate a 625 line 50 field T.V. system or 525 lines if we operate in the 525 line 60 field system. Alternate lines are written into separate stores and they may then be read out to form an interlaced picture at the correct T.V. field rate.

However, such simple systems rely on close agreement between the T.V. format and the film format, in particular on the ratio of film bar height to film frame height being equal to the temporal ratio of T.V. field blanking to active picture time, and also on the film frame rate being the same as the television frame rate of the television standard concerned.

This equality is only achieved for 16 mm normal format film operated on 625 line T./V. systems and run at 25 frames per second, and in order to achieve correct reproduction for any other film standard or speed special steps have to be taken. Earlier solutions to this problem involve changing the line scanning rate of the linear array from the standard value in order to generate the correct number of active (picture information containing) lines for each film frame during the time that it takes for a film frame to pass over the fixed row of the photo sensitive array. This leads to considerable complexity of the subsequent processing arrangements, since the signals have to be clocked in and out of the stores at different rates in order to bring the line scanning rate back to the standard value.

A further disadvantage of linear array systems is that it is not possible to produce a picture from a still film frame without having first moved the picture past the photo sensitive linear array and stored the picture information, and that it is not possible to observe the effect of any of the normal picture adjustment controls, e.g. focus, brightness, etc., whilst looking at a still picture, because all such still pictures are produced by reading out from stores rather than directly from the film.

According to the present invention there is provided a method of deriving a television signal representing picture information on a cinema film, the method comprising transporting the film frame-by-frame with continuous motion relative to a matrix of photo-sensitive devices arranged in a plurality of parallel rows, focussing an image of the moving film on the matrix, the rows of the matrix being disposed substantially perpendicular to the direction of motion of the image, and scanning the image of each film frame during its movement across the matrix by interrogating the matrix at a desired line frequency along a plurality of rows thereof with the said interrogation being stepped from one row of the said plurality to the next at successive instants during the scanning, thereby to derive from substantially the entire height of each film frame or a desired part thereof a desired number of scanned lines of electrical picture information different from the number which would be obtained if the scanning were performed along only a single row of the matrix, the method further comprising processing the scanned lines so derived to provide a television signal conforming to a desired standard.

The advantage of the method according to the invention is that it is possible, by stepping through the correct number of rows of the matrix in the correct direction, to derive a desired number of active lines from substantially the full height of each film frame (or a desired fraction thereof) in respect of a wide range of different combinations of film formats and film frame rates, while still maintaining the line scanning rate at the standard value. This considerably simplifies the subsequent processing circuitry.

Furthermore, the use of a matrix permits the production of a still picture by halting the film and cyclically interrogating the matrix row-by-row. Such a still picture would permit the observation of the effects of picture adjustment controls since the signals producing such picture would be produced by repeatedly scanning the actual image rather than repeatedly reading out from stores.

The invention further provides a telecine apparatus comprising a matrix of photo-sensitive devices arranged in a plurality of parallel rows, means for transporting a cinema film frame-by-frame with continuous motion relative to the matrix, the transport means being capable of transporting films of different formats and/or at different frame rates, an optical system arranged to focus an image of a moving film on the matrix, the rows of the matrix being disposed substantially perpendicular to the direction of motion of the image, means for scanning the image of each film frame during its movement across the matrix by interrogating the matrix at a desired line frequency along a plurality of rows thereof with the said interrogation being stepped from one row of the said plurality to the next at successive instants during the scanning, thereby to derive from substantially the entire height of each film frame or a desired part thereof a desired number of scanned lines of electrical picture information different from the number which would be obtained if the scanning were performed along only a single row of the matrix, means for selectively varying the number of rows interrogated in respect of each film frame image so as to accommodate different film formats and/or film frame rates, and means for processing the scanned lines so derived to provide a television signal conforming to a desired standard.

An embodiment of the invention will now be described, by way of example, with reference to the accompanying drawing which is a block schematic diagram of a telecine apparatus operating according to the 625/50 television standard.

Referring to the drawing, light from a source 1 is directed by a condenser lens 2 onto a film 3. The film is driven with continuous motion by a film transport mechanism schematically indicated by the spools 4 and 5. The transport mechanism 4, 5 is adapted to drive films of different formats and at different frame rates as desired. In the present embodiment it is assumed that the transport mechanism is arranged to handle not only 16 mm film of normal format but also 16 mm film of non-standard format and to drive any such film at any desired frame rate within design limits. Such transport mechanisms are known in the art and therefore do not require detailed description here.

After passing through the film 3 the light is passed via an optical system, represented by the objective 6, to a beam splitter 7 of known design which splits the light into red, blue and green components respectively. After emerging from the beam splitter 7 each of the red, blue and green components falls upon a respective two-dimensional matrix 8 of photo-sensitive devices as a respective coloured image of the moving film 3 focussed by the optical system 6. Each matrix 8 comprises a rectangular array of rows and columns of photo-sensitive devices, and each coloured image is focussed on its respective matrix 8 to a size such that, when 16 mm film of normal format is used, each film frame image is substantially the same size as the respective matrix 8 and moves, when the film 3 is driven, in a direction perpendicular to the rows of the matrix. Furthermore, the image of each film frame is laterally centered on the matrix such that at one position during its motion the image is momentarily in register with the matrix, and all three coloured images traverse their respective matrices in synchronism so that all are momentarily in register with their respective matrices at the same moment.

Each matrix 8 is identical in construction and in the present embodiment comprises 600 rows of photo-sensitive devices arranged in 800 columns. The figure of 600 rows is chosen as this represents approximately the number of active (picture information containing) lines in the 625/50 television standard, and the figure of 800 columnsis chosen to give adequate horizontal resolution. As will be described, the matrices 8 are scanned or interrogated under the control of a read control unit 9 to derive scanned lines of electrical picture information, and since all the matrices are interrogated identically and in synchronism we will only deal for the time being with the situation in respect of one matrix.

During the movement of each film frame image across the matrix 8 the read control unit 9 is adapted to interrogate selectively one ore more rows of the matrix at a line frequency determined by pulses H supplied at the terminal 10. The frequency of the pulses H is the standard line frequency of the 625/50 television standard. Each single interrogation of a row is initiated by a respective pulse H and is performed in the same way as the interrogation of the single linear array of the prior art, and produces a corresponding single scanned line of electrical picture information on the matrix output 14. The arrangement differs from the prior art, however, in that during the scanning of each film frame image the interrogation can be stepped from one row to another of the matrix, in either direction, under control of the read control unit 9. The operation of the unit 9 is as follows.

As mentioned before, in the case of normal format 16 mm film run at 25 frames per second, the film movement is by itself sufficient to provide all the vertical scanning movement required to provide the desired 600 active television lines from the full height of each film frame. Thus in this case the unit 9 is programmed to perform all the scanning (interrogation) of each film frame image along a predetermined single row of the matrix, such row being preferably located in the center of the matrix so as to allow for stepping in either direction in the case of films of non-standard format or different frame rates as will be described. The selection of this mode of single row scanning is effected by the application of appropriate signals on input terminals 12 and 13. The signals on 12 and 13 represent respectively the number of matrix rows to be scanned in 600 line periods, starting at the center row, and the direction of stepping. For the single row scanning mode the signal on 12 would represent one row to be scanned and that on 13 would be immaterial as no stepping can occur with only one row used, thus causing the unit to select the center row of the matrix and perform all the scanning along this one row.

Assume now that it is desired to run the normal format 16 mm film at only 24 frames/second. In this case, if only the single center row of the matrix were interrogated as before, after 600 lines has been scanned (the standard number of active lines in the 625/50 system) only 24/25ths of the total height of each frame image would have been covered, assuming such scanning to commence in respect of each film frame image when the top edge of the image is coincident with the center row of the matrix. In order to cover the total height of the film frame image with these 600 lines, therefore, the unit 9 is programmed so that, starting at the center row of the matrix 8 at the instant when the top edge of the film frame image is coincident therewith, the interrogation is stepped in the opposite direction to the image motion through a plurality of consecutive rows of the matrix in such manner that after 600 lines the particular row being interrogated is separated from the initial center row by a vertical distance equal to 1/25th of the height of the film frame image. Thus the 600th line will be derived from the bottom edge of the film frame image and the full height of the image will have been scanned with 600 lines which is the desired result. In the present case, using a 600 row matrix of idential dimensions to the normal format film frame image, 1/25th of the frame image height corresponds to 24 rows of the matrix. Thus in this mode of operation the interrogation is stepped from one row to the next after every 25 scanned lines.

This mode of operation is selected by applying a signal to input 12 representing 24 rows to be scanned and applying a signal to input 13 representing stepping in the opposite direction to the film image motion, thus actuating the correct stepping sequence of the read control unit 9 for the frame rate concerned (24 frames/second). It should be noted that the above interrogation sequence (or any other sequence programmed into the unit 9) is repeated for each film frame image, the sequence being initiated by a film frame pulse F applied at terminal 11 which identifies when the top edge of a film frame image is coincident with the center row of the matrix at which each scanning sequence commences.

Assume now that the 16 mm film being shown is driven at the original 25 frames/second but has a non-standard format wherein the frame height is only ⅔ that of the normal format but the frames are spaced along the film with the same spatial periodicity as the normal format film—in other words the ratio of film bar height to frame height is increased. In this case it will be seen that if scanning were performed only along the single center row of the matrix only 400 active lines would be needed to cover the full height of each film frame image. The full 600 active lines may be generated, however, by stepping the interrogation in respect of each film frame image through 200 rows of the matrix in the same direction as the film image motion, starting at the center row when the pulse F identifies coincidence thereof with the top edge of the frame image. Each of the 200 rows would thus be interrogated three times, and the last row interrogated would coincide with the bottom edge of the frame image. This mode of operation is selected by placing a signal on 12 representing 200 rows and a signal on 13 representing stepping in the same direction as the film motion.

From the above examples it will be seen that for a wide variety of combinations of film formats and film frame rates, within design limitations, it is possible by stepping through the appropriate number of rows of the matrix 8 to obtain the desired number (600) of active lines from the full height of each film frame. The interrogation of the matrix may be stepped in the opposite direction to the film image movement to augment the vertical scan provided by the film movement, or in the same direction to diminish the vertical scan provided by the film movement. Thus the input to 12 may be varied to select any number of rows up to 300 and the input to 13 may be varied so as to effect stepping in either direction.

It is to be noted that it is not necessary to derive the 600 active lines from the full height of each film frame image. By appropriate choice of signals on 12 and 13 it is possible to derive the 600 lines from a part only of the height of each film frame image, thereby effectively magnifying that part in the reproduced picture. In such a case it is necessary to delay the pulse F such that it occurs at the instant that the top of the selected part of the film frame image is coincident with the center row of the matrix.

A further refinement of the embodiment described above is to permit the transport mechanism 4, 5 to be halted so as to hold the film stationary with a frame image focussed on and in register with the matrix 8. Then, by cyclically scanning all the rows of the matrix 8 in sequence row by row, a still picture can be obtained by the further processing circuitry to be described. Such a still picture can be used to observe the effects of any of the normal picture adjustment controls (focus, brightness, etc.) since the picture is derived from repeatedly scanning the film frame image rather than repeatedly reading out the same sequence of signals from storage. This mode of scanning operation can be programmed into the read control unit 9 by placing an appropriate signal on input 15.

The inputs 12, 13 and 15 for the read control unit 9 may be set manually or automatically in accordance with the current film format and frame rate. From this input information the unit 9 generates the correct sequence of interrogation row addresses for each photomatrix 8. The calculations required may be performed by conventional logic or a microprocessor unit. In either case it is not thought that further details are necessary as, given the desired result, the means for carrying it out are readily available to those skilled in the art.

The outputs of the matrices 8 on the lines 14 are the colour value signals R, G and B which are further processed in known manner in the video channel and matrix 16 and color encoder 17 to form a single colour encoded signal. It should be noted that the colour encoder 17 is a sequential encoder as the scanned lines from the matrices 8 are sequential rather than interlaced.

The color encoded signal from 17 may be passed directly to a sequential-to-interlaced converter 19 to provide a standard 625/50 television signal on output 20. However, because of the fact that the photo-sensitive matrix is only capable of being scanned along rows fixed spatially at discrete intervals it is advantageous to interpolate between signals obtained immediately before and after stepping between adjacent rows of the matrix in order to reduce geometric discontinuities in the reproduced picture. The interpolator is shown at 18 and is controlled from the unit 8 by signals on line 21 which identify the moments of stepping from one row to the next. Without such interpolation, the reproduced picture would show an abrupt discontinuity where the scanning was stepped from one row to the next, the effect being most objectionable when only a small number of rows are scanned per film frame. Interpolation serves to lessen the effect of the step transition by making it appear more gradual. Interpolation techniques are well known in the art, for example in connection with standards converters.

It should be pointed out that the use of a 600 row matrix is a convenience based upon the desirability of deriving, by cyclic sequential scanning of the matrix, a still picture with the full number of active lines from a stationary frame of a normal format 16 mm film whose image size, as mentioned before, is substantially identical with the size of the matrix. However, if it is acceptable for test or adjustment purposes to derive a still picture from only part of the height of a film frame it is possible to have a matrix with less than 600 rows, since in practice few situations will require stepping of the interrogation through anything like the full number of 300 rows in either direction from the initial center row.

Furthermore, the pitch of the rows may be greater than that described above, for example the matrix may have the same physical size as the 600 row matrix but have only 300 rows at double the pitch. In such a case a still picture could nevertheless be obtained with the correct number of active lines by interpolating an additional line between each adjacent pair of the 300 actual scanned lines. It is to be understood, however, that in such case the number of rows stepped for any particular combination of film format and frame rate would be half the number stepped on the 600 row matrix.

An alternative arrangement to the above may be used in which the sequential-to-interlaced converter operates on the luminance (Y) and colour difference signals (R-Y, B-Y) and is followed by a conventional colour encoder. This arrangement has the advantage that for still pictures the reading of each matrix 8 may be changed from sequential form to normal interlaced T.V. form and the sequential-to-interlaced converter bypassed. Under these conditions the picture appearing at the output will be the same as that received from the matrices 8 and not one which has been delayed. This is because the process of sequential-to-interlaced conversion introduces at least one field of delay due to the necessity to write the information into stores over a period of two fields, which is the approximate duration of the sequential scan, and to read it out over one field. The interpolation system may be included in either the primary colour paths (R, G, B) or in the luminance and colour difference signal paths. In either case three interpolators will be required but their design will be easier than that of a single unit operating in the fully encoded path.

We claim:

1. A method of deriving a television signal representing picture information on a cinema film, the method comprising transporting the film frame-by-frame with continuous motion relative to a matrix of photo-sensitive devices arranged in a plurality of parallel rows, focussing an image of the moving film on the matrix, the rows of the matrix being disposed substantially perpendicular to the direction of motion of the image, and scanning the image of each film frame during its movement across the matrix by interrogating the matrix at a desired line frequency along a plurality of rows thereof with the said interrogation being stepped from one row of the said plurality to the next at successive instants during the scanning, thereby to derive from substantially the entire height of each film frame or a desired part thereof a desired number of scanned lines of electrical picture information different from the number which would be obtained if the scanning were performed along only a single row of the matrix, the method further comprising processing the scanned lines so derived to provide a television signal conforming to a desired standard.

2. A telecine apparatus comprising a matrix of photosensitive devices arranged in a plurality of parallel rows, means for transporting a cinema film frame-by-frame with continuous motion relative to the matrix, the transport means being capable of transporting films of different formats and/or at different frame rates, an optical system arranged to focus an image of a moving film on the matrix, the rows of the matrix being disposed substantially perpendicular to the direction of motion of the image, means for scanning the image of each film frame during its movement across the matrix by interrogating the matrix at a desired line frequency along a plurality of rows thereof with the said interrogation being stepped from one row of the said plurality to the next at successive instants during the scanning, thereby to derive from substantially the entire height of each film frame or a desired part thereof a desired number of scanned lines of electrical picture information different from the number which would be obtained if the scanning were performed along only a single row of the matrix, means for selectively varying the number of rows interrogated in respect of each film frame image so as to accommodate different film formats and/or film frame rates, and means for processing the scanned lines so derived to provide a television signal conforming to a desired standard.

3. A telecine apparatus as claimed in claim 2, further comprising means for selecting the interrogation in respect of each film frame image to be performed along only a single row of the matrix when the current film frame rate and film format correspond to a predetermined norm.

4. A telecine apparatus as claimed in claim 2, further comprising means for selecting the stepping of the interrogation to be performed as desired in the same direction as that of the film image motion or in the opposite direction thereto.

5. A telecine apparatus as claimed in claim 2, wherein the transport means is capable of holding a film stationary with a frame thereof focussed on the matrix, and wherein the apparatus further comprises means for cyclically interrogating the matrix row-by-row in order to derive a television signal corresponding to a still picture.

6. A telecine apparatus as claimed in claim 2, wherein the processing means includes interpolation means operative to reduce the geometric distortion introduced by the stepping from one row of the matrix to the next.

7. A telecine apparatus as claimed in claim 2, wherein the processing means includes a sequential-to-interlaced converter.

8. A telecine apparatus as claimed in claim 4, wherein the transport means is capable of holding a film stationary with a frame thereof focussed on the matrix, and wherein the apparatus further comprises means for cyclically interrogating the matrix row-by-row in order to derive a television signal corresponding to a still picture.

* * * * *